Feb. 17, 1959  C. R. OLNHAUSEN  2,873,724
PUSH-THROUGH TYPE POWER BRAKE MECHANISM
Filed July 1, 1953
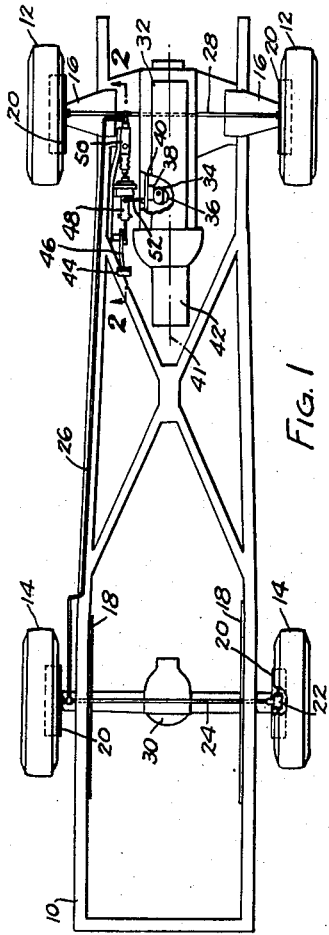
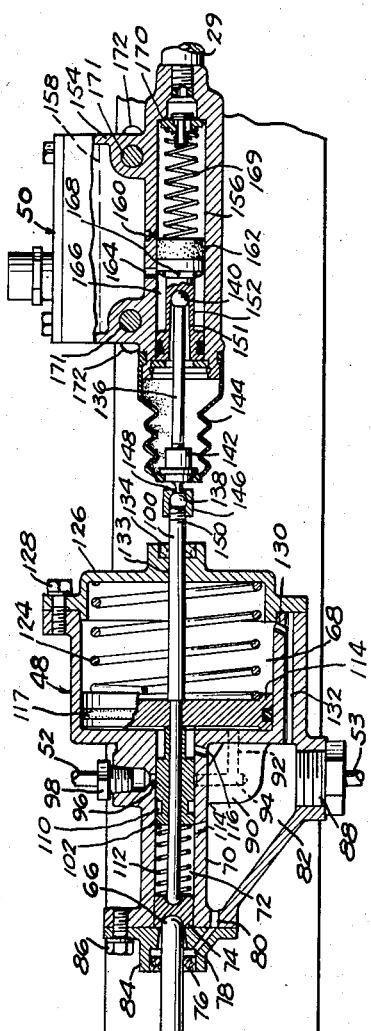
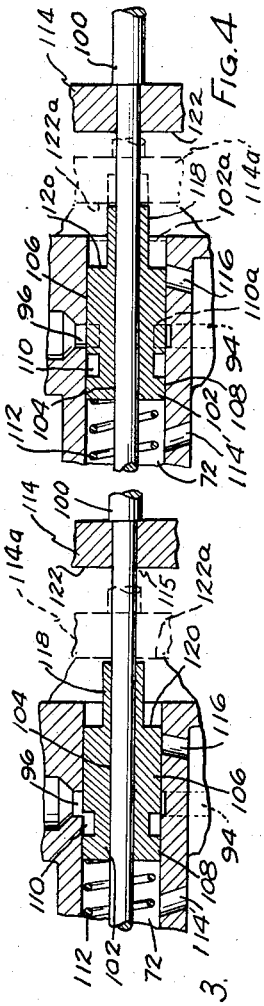
INVENTOR.
CHARLES R. OLNHAUSEN
BY
Wilson and Redrow
ATTORNEYS United States Patent Office 2,873,724
Patented Feb. 17, 1959

2,873,724

PUSH-THROUGH TYPE POWER BRAKE MECHANISM

Charles R. Olnhausen, St. Clair Shores, Mich., assignor to Studebaker-Packard Corporation, a corporation of Michigan Application July 1, 1953, Serial No. 365,392

4 Claims. (Cl. 121—41)

The present application relates to power brake mechanism, particularly to tandem arranged power and master cylinder units suitable for automotive and other friction brake applying uses.

An object of the invention is the provision of independent fixed power and master cylinder units in an axially spaced apart arrangement characterized by the fact that the units are connected together by a detachable swivel coupling permitting ready removal of either unit without interference with the fixed position of the other unit.

Another object is the provision of a manual-member-actuated, valve-member-controlled power mechanism having an interposed spring engaging the manual and valve members so as to permit the valve member under reaction pressure to have the dual function of reacting yieldably against the manual member and also automatically serving as a spring loaded relief valve in the accomplishment of its control valve function.

Another object is to provide such a valve member as of the preceding paragraph, which combines with its automatic pressure relieving function a feel-back function measured by the yieldable thrust thereof on the spring and against the manual member such that the operator of the manual member does not have a detached feeling on operation of the mechanism, but rather senses the feel of the effort of the valve controlled mechanism which he in fact is controlling through proper operation of the manual member.

In line with the accomplishment of the foregoing objects, a feature of the invention is the side by side relationship of the tandem driving and driven power and master cylinder units with respect to a slightly forwardly inclining pressure lubricated engine from which lubricating oil pressure is utilized not only to lubricate the engine but also to provide the fluid pressure necessary to actuate the driving power unit.

Another object is the provision of tandem connected power and master cylinder units in which a push through rod type actuator is utilized such that a positive end to end mechanical train is always available for emergency use, regardless of the failure or inadequacy of the source of pressure necessary for operating the power unit.

Another object of the invention is the provision of a simple power unit suitable for tandem use with existing master cylinders of different prevailing designs and which by simple adaptive fittings is easily connected thereto, and which further lends itself to certain economies of manufacture and assembly.

An additional object is the general provision, in a spring returned movable wall type pressure motor having the characteristics of feel-back control rod actuation, of a pressure control valve having one end-adjacent said wall and providing two areas, both potentially subject to, but only one continuously exposed to, reaction pressures in that under some conditions the movable wall covers and shields the other area from pressure. In particular, the arrangement contemplates control rod actuation of the character in which the control rod takes the combined feel-back thrust from the control valve reaction force and the spring returned movable wall force until the pressure fluid pressure can overcome the force due to the return spring.

Under conditions of low reaction pressure, one of the two areas on the valve is exposed to the pressure forces tending to cause relative separation of the movable wall and the valve, whereas the wall covers the other area on the valve in the aforesaid manner and prevents exposure of the same to fluid forces. Higher reaction pressures occasioned by an increase in the fluid pressure sufficient to cause movement of the movable wall and relative separation to occur as between the wall and the piston with a resultant uncovering of the other area on the valve, cause full effective pressure to be exerted on both of the two areas at the end of the valve and full reaction force to be applied thereagainst. Thus a smooth transition in the control rod thrusts occurs, whereby the combined return spring and partial reaction forces are smoothly and equivalently replaced by the full reaction force affecting the two valve areas as the fluid force takes over and finally overcomes the entire strain prevailing in the return spring. Any surge of the pressure fluid as it unloads the control rod from the piston-transmitted return spring forces is substantially simultaneously manifested in its compensating effect on the double valve areas and hence the net result of the surge is practically insignificant.

Another object is to provide a valve formation offering the foregoing differently functioning two end areas of the preceding paragraph, in which the simple expedient for forming the same involves the mere reduction of one circular section so as to produce in the one section two valve portions having different or dissimilar diameters.

Further features, objects and advantages will either be specifically pointed out or become apparent when for a better understanding of the invention reference is made to the following written description taken in conjunction with the accompanying drawings in which:

Figure 1 is a plan view out of an automobile to which the present power brake mechanism is applied;

Figure 2 is a longitudinal view of the valve-controlled brake mechanism taken along the lines 2—2 of Figure 1; and, Figures 3 and 4 are sequential views showing the control valve of Figure 2 in progressive stages of its operation.

In the drawings an engine propelled vehicle of the automotive type, appearing in plan view in Figure 1, is shown to have a chassis 10 and pairs of opposite front wheels 12 and rear wheels 14 from which the vehicle chassis is appropriately spring suspended by respective sets of front suspension assemblies 16 and rear suspension assemblies 18. The vehicle 10 has four wheel brakes, one on each wheel as at 20 and each including a wheel cylinder as typified at 22 for receiving hydraulic fluid under pressure to apply the brakes. A brake line 24 connected between the wheel cylinders in the rear wheels 14 receives hydraulic fluid from a rearwardly directed distributing line 26 and a forward brake line 28 is connected between the wheel brake cylinders for the front wheels 12 for applying the brakes of the same. A common brake fluid pressure fitting 29 supplies both lines 26, 28. The rear wheels 14 provide traction for the vehicle and are driven from an engine powered differential 30 at the rear of the chassis 10. The vehicle has a multicylinder engine 32 for powering the differential 30 which may be an in-line 6 cylinder full pressure lubricated engine of the wet-crankcase type generally as shown at page 1 of Service Manual, Engine Section V, Packard Motor Car Company, Detroit 32, Michigan, First Edition 1948. The full pressure lubrication system according to the engine 32 includes a pressure creating rotary gear oil pump 34, a full flow oil filter 36 in series therewith, and a pressure regulating valve 38 which receives oil from the filter 36 and which may be integrally incorporated in the body of the pump 34. The pressure regulating valve 36 admits oil to and controls the oil pressure maintained by the pump 34, in a lubricating oil gallery 40 incorporated in the engine in a manner such that oil pressures in excess, for instance of 40 p. s. i., are vented back to the engine crankcase, not shown. The engine 32 is so disposed that its longitudinal axis indicated at 41 is inclined forwardly with respect to the horizontal, with the result that the forward end of the engine 32 is relatively high and the rear end which incorporates a change speed transmission 42, is relatively low. In side by side relationship with respect to engine 32 at the left side thereof, there is provided a push-through type power actuator comprising a longitudinally spaced apart brake pedal 44 and pedal lever 46 unit, a power brake unit 48, and a means communicatively connected to and supporting the pressure fitting 29 for pressurizing the same to apply the four-wheel hydraulic brakes 20. An illustrative form of the applying means for the latter is a master brake cylinder unit 50 of the general type shown in the U. S. Patent No. 1,988,395, in which the hydraulic brake pressure fitting 29 is threadably received in one end of the cylinder unit 50. A transversely disposed crosspipe 52 and another transversely disposed crosspipe 53 therebeneath are utilized to connect respectively the oil gallery 40 and inlet to the power unit 48, and the outlet to the power unit 48 and the crankcase, not shown, for the engine 32. The pedal accuated brake lever 46 has a return spring 54 and is pivotally mounted at 55 to a chassis supported bracket 56 so as to swing about the lever lower end. The lever 46 has a short bell-crank-like arm 58 rigid therewith and having an outer end which describes an arc of movement generally indicated at 60 about the pivot 55 as a center. The just-noted outer end of the short arm 58 carries a pivot 62 connecting it to a push rod actuator control 64 having a rounded front end 66.

The power brake unit 48 is a pressure motor device which is securely fixed by bolts or other fasteners to the chassis 10 and includes a unitary casing having a large cylinder at one end defining a working chamber 68 and having a reduced tubular portion 70 which defines a smaller cylindrical chamber 72. The noted round end 66 of the push rod actuator 64 is received in a first semispherical socket formed in a crosshead 74 which is slidably received in the cylindrical chamber 72. A felt seal 76 slidably receives the push rod actuator 64 and defines one side of an oil collecting annular chamber 78 which is connected by a pair of intersecting drain passages 80 to an oil accumulation drain chamber 82 formed in the casing for the power brake unit 48. The felt seal 76 is retained in a closure head 84 secured to the tubular part 70 of the power brake unit as by two or more screw fasteners 86. A screw fitting 88 provides a connection between the oil drain chamber 82 and the outlet pipe 53 which leads transversely into the crankcase for the engine 32. The drain chamber 82 has at one side an inwardly deflected wall 90 which is traversed by a set of two intersecting bores 92 and 94 arranged at right angles to one another. The bore 92 has an opening at its outer end which leads into the working cylinder 68 and the bore 94 has an opening into the chamber 72 at a point diametrically opposite to an oil introduction opening 96 therein. The opening 96 is at one end of an inlet passage which receives a screw fitting 98 connected to the transversely disposed oil inlet pipe 52 for leading a supply of lubricating oil from the gallery 40 in the engine 32.

As heretofore noted, the pressure in the gallery 40 and in the pipe 52 may be appropriately regulated by the valve 38 so as not to exceed 40 p. s. i. for instance. A slidable piston push rod 100 having respective small diametered and large diametered ends extends through the power unit 48 and is arranged such that the small diametered end is rounded off and received in a second semispherical socket formed in the crosshead 74. A circular spool type reaction valve 102 has a longitudinally extending bore 104 centrally thereof which slidably receives the small diametered end of the rod 100 with sufficient clearance that the valve 102 and the rod 100 are freely slidably related to one another so as to be entirely independent in their respective movements. The valve 102 has an axially long land 106 and an axially short land 108 which are spaced apart so as mutually to define an intervening annular groove or recess 110. Axially slidable movement of the valve 102 between an ineffective at-rest position as shown in Figure 2 and a fully open effective position as at 102a in Figure 4, for instance movement to an intermediate or partial operating position shown to be effective in full lines in Figure 3, is such as to cause at least partial registry of the annular groove 110 and the opening 96 and the opening for the passage 94 so as to interconnect the two latter and provide for the application of oil pressure into one end of the working chamber 68.

An elastic member 112 in the form of a light coil spring surrounding the end of the shaft 100, is provided between and engages the crosshead member 74 and the valve 102 so as to tend to separate the same and move the valve into its effective position. The crosshead member 74 thus not only provides a connection between the control rod actuator 64 and the piston rod 100, but also by its movement tends to control the position of the valve 102 and take any reaction therefrom. A short passage 114' through the wall of the tubular part 70 serves to conduct fluid which leaks past the short land 108 into the drain chamber 82 and another short passage 116 is provided in the tubular part 70 so as to connect the effective end of the working chamber 68 and the drain chamber 82. The passage 116 is arranged such that the opening at its inner end may be covered by the valve 102 when the latter is advanced slightly past the solid line position shown in Figure 4 into the active or effective position shown in solid lines in Figure 3. In the last noted position, the drainline 116 from one end of the working cylinder is completely occluded by the long land 106 and the inlet pipe 52 is connected through the valve 102 and appropriate passages to one end of the working chamber 68. The valve 102 is, prior to initial movement of relative separation of a working piston 114, physically engaged to the piston 114 which may be made fast to the piston rod 100 due to a close interference or pressed fit, but preferably due to being staked as at 115 to the rod 100, Fig. 3. The piston 114 is pressure movable and is provided with a piston ring in the form of an O-ring rubber seal 117 which sealingly engages the walls of the working cylinder 68. The circular sectioned valve 102 is provided with a set of double diameters at one section thereof by being relatively relieved at 118 adjacent the end which is physically engaged with the piston 114. Thus a two-portioned compound end area is presented, the one portion having the smaller diameter being directly engageable with the piston 116 and the other portion being indicated at 120 and of an area based on the difference in diameters. The noted one area as compared with the other is in about the ratio of 1:3 as shown but a reversal of this ratio or else other ratios might be found to be more or equally advantageous under some circumstances. The area at 120 is of the formation of a circular transverse surface which confronts an opposite surface 122 on a portion of the head of the piston 114 and when exposed to fluid pressure, these confronting surfaces are pressurized with forces tending to separate the valve and piston elements 102, 114.

Similarly, the light coil spring 112 acting against the confronting surfaces on the crosshead member 74 and the valve member 102 tends to separate these latter two members. An elastic means which may be in the form of a heavy coil spring 124 surrounding the piston rod 100, serves as a return spring engaging the piston 114 and seats in a closure head 126 which closes the end of the working cylinder 68 and which is secured to the power unit as by two or more screw fasteners 128. The heavy and light springs 124 and 112 act in concert tending to oppose relative separation between the valve and piston elements 102, 114. A pair of intersecting short and long passages 130 and 132 serve to connect the opposite or non-working end of the work cylinder 68 and the oil drain chamber 82 so as adequately to handle any oil leakage past the piston ring seal 117. The closure head 126 has a smooth bore 133 therein forming a slide bearing for the piston rod 100 and a felt washer 134 is provided in the closure head 126 to act as a dust seal for the rod 100.

A double-ended thrust transmitting rod 136 for the brake cylinder mechanism 50 has a ball 138 and 140 at the respective ends thereof. The rod end portion adjacent the ball 138 has a small diameter shank and a threaded section for threadably receiving a collar to which one end of a rubber master cylinder boot 134 may be secured. A socket providing hex nut 146 has a rear flange 148 which is spun over the small shank so as to retain the ball 138 positively but flexibly within the socket. The hex nut 146 is internally threaded at its open end for receiving a threaded portion 150 formed at the extremity of the large diametered end of the piston rod 100. The threaded portion 150 is concavely hemispherical so as to present a surface complementary to the ball 138 and the ball 138 is arranged with respect to the spun over-flange 148 so as to permit limited tilting movement thereof but at the same time, providing a positive 2-way swivel coupling connection.

The opposite ball 140 on the thrust transmitting rod 136 is received in a slightly tapered deep receiving socket 151 having an hemispherical floor and formed in a master cylinder piston 152 contained in the means 50 for applying the four wheel brakes for the vehicle. The interior of a one-piece casting 154 provides a cylindrical master cylinder chamber 156 for the brake applying means 50 and has a reservoir chamber 158 thereabove for holding brake fluid. The fluid used in the brake system is a special oil which does not become thick at ordinary low temperatures and the supply of this oil which is maintained in the reservoir 158 is free to flow by gravity through a small passage 160 through the cylinder wall. The small passage 160 is located at a mid point in the cylinder 156 and communicates with the interior thereof immediately in front of the inner end of a packing cup 162 which is carried at the forward end of the piston 152. A larger passage 164 connects the reservoir 158 and the cylinder 156 at a point intermediate the length of the piston 152 which is enlarged at both ends so as to provide an annular recess 166. The annular recess 166 extends throughout a major part of the length of the piston such as to maintain communication between the passage 164 and the recess 166 throughout the full piston movement. The detailed construction of the piston 152 in these respects and in the further respect of having a plurality of passages 168 provided through the forward enlarged end thereof and interconnecting the recess 166 and the space immediately in front of the piston are disclosed in detail in the noted Patent No. 1,988,395. In brief, as to operation, however, the passages 168 are opened at only predetermined times during reciprocative motion of the piston and are closed when the full end area of the packing cup 162 engages with the end of the piston 152.

The piston 152 and the cup 162 are at all times subject to the force of an elastic means 169 in the form of a light coil spring which, when compressed, tends to restore the piston and cup to their retractive positions somewhat more rapidly than they would be returned due to returning motion of the high inertia hydraulic fluid in the chamber 156 and the various brake lines connected thereto, thus causing a condition of reduced pressure to prevail in the cylinder 156 and a seepage of fluid past the passages 168 and out of the space behind the cup 162 into the working space of the master cylinder 156 during each ordinary spring induced return stroke of the piston 152.

As a result of this mode of operation, at the end of the retractive movement of the piston 152 there is an excess or greater quantity of fluid in the cylinder 156, the fitting 29 and the pipes 26, 28 than that required to fill them when the piston 152 is in its normal position. The consequence is that the excess fluid passes upwardly through the passage 160 into the reservoir 158; if at this time bubbles of air have accumulated in the master cylinder 156, they will be carried out through the passage 160 along with the excess fluid. A double acting check valve 170 is mounted at the same end of the cylinder 156 to which the screw fitting 29 is connected and performs the function of maintaining a slight positive pressure in the fluid system effective throughout the pipes 24, 26, 28 and the wheel cylinders and reducing the possibility of the admission of air into the master cylinder to a minimum degree. Such continual positive pressure in effect keeps all slack out of the fluid system and consequently lost motion is no problem.

Mechanically, however, a slight amount of lost motion is necessary in the master brake cylinder mechanism and to this end a plurality of retaining screws 171 is provided for fixedly securing the brake cylinder device 50 to the automotive vehicle chassis 10. The individual screws 171 are adjustably received in longitudinally elongated mounting slots 172 in the chassis for the purpose of permitting relative axial shift of adjustment as between the power brake device 48 and the master brake cylinder device 50 to the extent that about .006" for instance will desirably separate the end of the ball 140 on the double-ended thrust link 136 and the floor of the socket 151 formed in the piston 152. In one physically constructed embodiment of the master brake cylinder 50 contemplated by the present invention, the clearance between the ball 140 and the floor of the socket was in fact .006" and the full piston stroke was 1.438". The full angularity of the thrust transmitting rod 136 for pushing the piston 152 was 1½° or less in one of the full off or on positions and 3° or less in the other full position. The swivel coupling 138, 146 under circumstances which will be assumed to be the foregoing permits a tilting action of no greater than 3° under any condition and beyond that point, an interference will develop as between the spun-over flange 148 and the small shank supporting the ball 138. Hence a slight degree of inexact alignment can be permitted to occur as between the power and brake cylinder units 48, 50 when fixed in place.

The operation of the device of the Figures 1 through 3 is as follows: From the at-rest position, Figure 2, occupied by the relatively axially shiftable valve element 102 and piston element 104 and other elements, motion of the pedal actuated control rod 64 to the right causes the crosshead 74 to move and with it, carrying the double diametered piston rod 100, the power piston 114, the brake thrust rod 136, and the brake master piston and cup 152, 162. Simultaneously, a compressive force is introduced into the light coil spring 112, tending to force the spring 112 and the double diametered control valve 102 to the right in unison with the power piston 114. After about .500" for instance of valve travel, the valve 102 advances far enough to the right, according to the solid line showing of Figure 3, to cover the return passage 116 and partially open the pressure fluid inlet port 96 so as to connect the same to the intersecting passages 94, 92 leading to the working end of the power cylinder 68.

The motion occurring to the extent thus far described is due solely to the physical force exerted by the operator and results in the taking up entirely of the lost motion slack, between the ball 140 and the floor of the piston socket 151 and further results in applying a slight load tending to collapse the piston return spring 124 which may be pre-loaded or not as desirable when being assembled in the power cylinder unit 48. Due to a valve controlled rise in pressure between the confronting surfaces 120 and 122 and in fact effective over substantially the entire end area of the power piston 114, the piston 114 will at a certain point undergo a slight initial fluid actuated movement such that it occupies the relative dotted line position shown by the dotted lines 114a in Figure 3. At or about the time of such initial fluid actuated movement of the piston, two events are substantially simultaneously occurring. Not only does the piston of itself assume the entire load thrust maintained thereagainst by the heavy return spring 124, but at the same time the piston uncovers the extreme end of the reduced portion 118 of the valve 102 which is perforce immediately subject to the same pressure fluid pressure of the amount necessary to move the piston 114 and already effective on the piston and part of the end area of the valve.

The total reaction thrust on the valve in the direction of the spring 112, therefore, markedly increases about the time that the pressure fluid pressure intially effects movement of the piston 114 and relieves the piston rod of the spring load at 124 and the net thrust of feel-back in the control rod 64 tends to be restored to its previous value. The flow of fluid through the port 96 past the valve 102 and into the working cylinder 68 causes the piston 114 to move over progressively from the dotted line position 114a in Figure 3 to the full line position shown by solid lines 114 in Figure 3, to an extent of total travel roughly equal to the previously noted stroke of the master piston 152 in the cylinder 156, namely about 1.500". The last portion of the travel of the piston 114 is under the influence of relatively higher pressures necessarily due to the encountering of the piston 152 of greater resistance produced by the hydraulic brake system.

Accordingly, the pressure exerted against the double diametered end portions of the valve 102 becomes increasingly greater and the feel-back thrust conducted along the spring 112 and control rod 64 to the operator of the vehicle becomes considerably greater; thus the operator is continually apprised of the magnitude of the resistance encountered by the system and has a sense of feel as to its action and effectiveness. In addition, the spring 112 is elastic to the extent that it provides a deflectible coupling such that in case dangerously high pressures are imposed in the power brake cylinder 68, the pressures effective on the double diametered reduced end 118 of the valve will furnish sufficient force to collapse the spring 112 and cause the valve to open the drain passage 116 according to the position shown in solid lines in Figure 4. It is of course to be understood that in cold weather when the lubricating oil is very viscous and stiff and causes considerable back pressure in the passage 116 leading to the drain chamber 82, the pressures maintained in the working chamber 68 will tend to be rather large even when the valve land 106 controlling the inlet port 96 is nearly closed; in such event, the high reaction pressure tends to retract the valve and open up the drain line 116 in the manner of an automatic safety valve. With respect to the other extreme of operation, the maximum pressures to which the working cylinder can be subjected as when the engine 32 is idling for long periods in summer weather, is about 25 p. s. i. owing to the combined factors of slow speed of the pump 34, lack of viscosity in the hot lubricating oil, and very free flow of the oil in the pressure lubrication system so as to drain off the pump output rather strenuously. At all events however, the working pressure differential across the piston 114 will be in excess of the less than one full atmosphere differential available to the so-called manifold vacuum brake systems currently on the market, and hence a smaller diametered power piston and reaction area are presently permissible than with vacuum type systems. The major diameter of the circular sectioned spool valve 102 may be only 2 or 3" or even less.

The much more common situation, however, where the solid line position of Figure 4 of the preceding paragraph prevails, occurs where the vehicle operator releases the lever 46 and permits the control rod 64 to be relieved of the manually imposed thrust load thereon. In such instance, the valve 102 retracts and the pressure fluid in the chamber 68 is vented and returned through the outlet 116 under the influences of the return spring 124 which expands and carries the piston 114 back to its at-rest position; movement of the latter produces an engagement between the piston and the double diametered reduced end 118 of the valve 102 as shown at 114a in Figure 4, restoring the valve 102 fully to its at-rest or ineffective position.

As herein disclosed, the control valve is shown to have its long land shorter with respect to the inlet passage in the valve body than with respect to the outlet passage, such that the inlet will begin to uncover and be opened by the valve only after the outlet is already closed. It is evident that the inlet and outlet can be made to open and close respectively at the same time or even arranged such that the inlet opens prior to the outlet closing merely by increasing the axial length of the land to a small degree or to a larger degree with respect to the inlet passage. So also the drawing shows, as between the mutually engaged valve element and piston element, the valve to be the element relatively relieved so as to make possible the confronting valve and piston surfaces 120, 122, but self-evidently the valve can be provided with a constant girth and the piston element relatively relieved threadjacent or both elements can be relatively relieved to produce the desirable confronting surfaces which are exposed alike to fluid pressure. The piston member 114 and the double diametered piston rod member 100 are shown arranged to be staked together for positive movement one member with the other, and although this arrangement is preferable, it may be found under certain circumstances that independent motion between these two members may be desirable to the extent that the piston member 114 is slidably related with respect to the small end of the double diametered rod 100, in which case the operation previously described will be slightly altered, in that the spring 112 will be of slightly heavier construction than before with respect to the even heavier spring 124 and the initial pressure actuated movement of the piston 114 occurs when the piston slidably moves up to the shoulder provided by the double diameters on the rod 100.

The present driver operated actuator is in the form of a pedal lever, supported so as to pivot at its bottom end but indeed, it is not essential to the invention that the lever be of the pedal type or be pivoted at one end and a pendant supported pedal may be applied to equal advantage so as to depend and swing about an upper pivot or else a hand lever may be employed as the actuator and be pivoted optionally at either end thereof as desired.

I claim:

1. In a device of the character described, a power brake cylinder having a pressure movable piston element therein, a reduced tubular extension at one end thereof, a valve element in the extension engageable at times against and yieldably connected for limited coordinated initial movement with the piston element, and stationary fluid passage means in the extension in the path of the limited initial movement of the valve element and controllable thereby to control the application of pressure fluid against the piston for continuing movement of the same under power, said valve and piston element being relatively relieved in the vicinity of their portions of engagement with one another to expose at least one valve area to the pressure fluid being applied contingently with the initial movement so as to bodily displace and separate the piston engaging valve from the piston under continuing movement of the latter, and arrest motion of the valve in a yieldably balanced position in passage controlling adjacency to the stationary fluid passage means.

2. For use in an engine propelled vehicle having an element actuable to perform work, a push-through type power mechanism comprising a plurality of axially aligned push rods, one rod being a driver operated control rod, another rod serving as a piston rod having a fluid pressure motor coaxial therewith for moving the same to actuate the work performing element, said motor being adapted for internally receiving working fluid and comprising mutually engaged discrete piston and valve members therein capable of motion of relative separation in an axial direction, said valve member being formed with a double-diametered section having its end area subject to a force proportional to the internal working fluid pressures exerted on said piston member when the members are separated and having a portion of the end area covered by said piston member when the members are mutually engaged so as to exclude such portion from the effect of the fluid pressure at all times prior to initial relative movement of separation between the members, means including the valve member through which working fluid pressure common to the members is introduced internally into the pressure fluid motor, and elastic means engaging each of said members tending to prevent relative separation of the same due to working fluid pressure.

3. For use in a vehicle having an element actuable to perform work, a push-through type power actuator to actuate the work performing element comprising a plurality of axially aligned push rods, one of said rods being a driver operated control rod and another being a piston rod, a pressure fluid motor adapted to receive working fluid under pressure internally thereof and slidably receiving said other rod for applying power to the same, said motor including mutually engaging piston and valve members therein capable of motion of relative separation in an axial direction, one of said members having a double-diametered section so arranged adjacent the other member that the members present confronting spaced apart surfaces of a common effective dimension equal to the difference in the diameters, said double-diametered section having its end area subject to a force corresponding to the internal working fluid pressures exerted on the said other member when the members are separated and having a portion of the end area covered by a portion of the said other member when the members are mutually engaged so as to exclude such portion which is on the valve member from the effect of the fluid pressure on the piston member at all times prior to initial relative movement of a separation between the members, means including the valve member through which working fluid pressure is introduced in common to the members internally into the motor, and means continually biasing each of said members toward mutually engaged position in opposition to the force of separation of said working fluid pressures.

4. A power brake mechanism for use with a brake pedal comprising casing means defining first and second communicating chambers, said second chamber being of larger diameter than said first chamber, an abutment element slidably disposed in said first chamber and being movable in response to operator actuation of said pedal, a pressure moveable element slidably disposed in said second chamber, rod means extending between said elements, a fluid inlet port in said first chamber, fluid conduit means between said first and second chambers, valve means having advanced and retarded positions slidably disposed in said first chamber between said elements for admitting fluid from said inlet port to said fluid conduit means when said valve means is in the advanced position, said valve means being moveable relative to said rod means and being hydraulically balanced at all times relative to said inlet port, said valve means having an extended portion of lesser diameter adapted to abut said pressure moveable element, first resilient means between said abutment element and said valve means, second resilient means biasing said pressure moveable element towards said first chamber, and drain port means for said first chamber closed by said valve means in the advanced position and open in the retarded position.

References Cited in the file of this patent

UNITED STATES PATENTS

| 1,472,801 | Loughead | Nov. 6, 1923 |
| 1,781,869 | Bragg et al. | Nov. 18, 1930 |
| 2,040,755 | Meyer | May 12, 1936 |
| 2,130,799 | Hofstetter | Sept. 20, 1938 |
| 2,229,247 | Kamenarovic | Jan. 21, 1941 |
| 2,241,374 | Alfieri | May 13, 1941 |
| 2,265,546 | Price | Dec. 9, 1941 |
| 2,343,698 | Parnell | Mar. 7, 1944 |
| 2,352,357 | Almond | June 27, 1944 |
| 2,395,223 | Ingres | Feb. 19, 1946 |
| 2,457,721 | Price | Dec. 28, 1948 |
| 2,544,042 | Pontius | Mar. 6, 1951 |
| 2,642,165 | Banker | June 16, 1953 |
| 2,661,597 | Edge | Dec. 8, 1953 |
| 2,745,383 | Hupp | May 15, 1956 |

FOREIGN PATENTS

| 656,845 | France | Jan. 5, 1929 |
| 747,273 | France | Mar. 28, 1933 |
| 378,025 | Italy | Jan. 17, 1940 |